(12) United States Patent
Moshfeghi

(10) Patent No.: US 9,360,337 B2
(45) Date of Patent: Jun. 7, 2016

(54) NAVIGATION SYSTEM AND METHODS FOR ROUTE NAVIGATION

(75) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 2773 days.

(21) Appl. No.: 11/820,580

(22) Filed: Jun. 20, 2007

(65) Prior Publication Data

US 2008/0319653 A1    Dec. 25, 2008

(51) Int. Cl.
| G01C 21/30 | (2006.01) |
| G01C 21/36 | (2006.01) |
| G01C 21/26 | (2006.01) |

(52) U.S. Cl.
CPC .......... *G01C 21/3608* (2013.01); *G01C 21/26* (2013.01); *G01C 21/362* (2013.01)

(58) Field of Classification Search
None
See application file for complete search history.

(56) References Cited

U.S. PATENT DOCUMENTS

| 5,999,124 | A | 12/1999 | Sheynblat |
| 6,131,067 | A | 10/2000 | Girerd et al. |
| 6,185,427 | B1 | 2/2001 | Krasner et al. |
| 6,215,441 | B1 | 4/2001 | Moeglein et al. |
| 6,321,158 | B1 | 11/2001 | DeLorme et al. |
| 6,735,518 | B2 * | 5/2004 | Kim .............................. 701/209 |
| 6,829,475 | B1 | 12/2004 | Lee et al. |
| 6,920,330 | B2 | 7/2005 | Caronni et al. |
| 7,043,234 | B2 * | 5/2006 | Chun et al. ................. 455/414.2 |
| 7,292,935 | B2 * | 11/2007 | Yoon .............................. 701/209 |
| 7,774,132 | B2 | 8/2010 | DeGrazia |
| 7,860,515 | B2 * | 12/2010 | Chun et al. .................. 455/456.1 |
| 2001/0002455 | A1 | 5/2001 | Uekawa et al. |
| 2001/0005809 | A1 * | 6/2001 | Ito .................................. 701/210 |
| 2004/0066330 | A1 | 4/2004 | Knockeart et al. |
| 2004/0104842 | A1 | 6/2004 | Drury et al. |
| 2004/0128215 | A1 | 7/2004 | Florance et al. |
| 2004/0148101 | A1 | 7/2004 | Morita et al. |
| 2005/0030160 | A1 | 2/2005 | Goren et al. |
| 2005/0049785 | A1 | 3/2005 | Vergin |
| 2005/0075119 | A1 | 4/2005 | Sheha et al. |
| 2005/0088284 | A1 | 4/2005 | Zai et al. |
| 2005/0198228 | A1 | 9/2005 | Bajwa et al. |
| 2005/0234639 | A1 | 10/2005 | Endo et al. |

(Continued)

OTHER PUBLICATIONS

Portions of prosecution history of U.S. Appl. No. 11/820,579, filed Dec. 6, 2010, Moshfeghi.

(Continued)

*Primary Examiner* — Ryan Zeender
*Assistant Examiner* — Christopher Buchanan
(74) *Attorney, Agent, or Firm* — Adeli LLP

(57) ABSTRACT

Embodiments of the present invention include systems and methods for improved navigation using the global positioning system (GPS). A method of improved navigation includes transmitting a destination to a navigation server through a wireless communication channel. The method further includes transmitting position information from a GPS-enabled device to the navigation server through the wireless communication channel automatically at a time interval. The method further includes generating navigation information by the navigation server. The navigation information is based on the position information and the destination. The method further includes receiving navigation information on the GPS-enabled device from the navigation server through the wireless communication channel.

31 Claims, 10 Drawing Sheets

(56) References Cited

U.S. PATENT DOCUMENTS

| | | | |
|---|---|---|---|
| 2005/0242188 A1 | 11/2005 | Vesuna | |
| 2006/0063539 A1 | 3/2006 | Beyer, Jr. | |
| 2006/0116800 A1 | 6/2006 | Obradovich et al. | |
| 2006/0147078 A1 | 7/2006 | Neu et al. | |
| 2006/0229778 A1 | 10/2006 | Obradovich et al. | |
| 2007/0005368 A1 | 1/2007 | Chutorash et al. | |
| 2007/0042812 A1 | 2/2007 | Basir | |
| 2007/0083324 A1* | 4/2007 | Suzuki et al. | 701/201 |
| 2007/0086579 A1 | 4/2007 | Lorello et al. | |
| 2007/0168118 A1 | 7/2007 | Lappe et al. | |
| 2007/0185651 A1 | 8/2007 | Motoyama et al. | |
| 2007/0205875 A1* | 9/2007 | De Haan | 340/425.5 |
| 2008/0027643 A1 | 1/2008 | Basir et al. | |
| 2008/0039120 A1 | 2/2008 | Gad | |
| 2008/0076418 A1 | 3/2008 | Beyer, Jr. | |
| 2008/0183376 A1 | 7/2008 | Knockeart et al. | |
| 2008/0238941 A1 | 10/2008 | Kinnan et al. | |
| 2008/0248815 A1 | 10/2008 | Busch | |
| 2008/0319652 A1 | 12/2008 | Moshfeghi | |
| 2010/0100310 A1 | 4/2010 | Eich et al. | |
| 2010/0106406 A1* | 4/2010 | Hille et al. | 701/206 |

OTHER PUBLICATIONS

Sun Microsystems, "The Sun Global RFID Network Vision: Connecting Businesses at the Edge of the Network", A Technical White Paper, Jul. 2004, pp. 1-20.
Auto-ID Center, Auto-ID Savant Specification 1.0, 2003, pp. 1-58.
Cisco Systems, "Delivering an Intelligent Foundation for RFID: Maximizing Network Efficiency With Cisco RFID Solutions", 2005, pp. 1-6.
Cisco Systems, Cisco Application-Oriented Networking Facilitates Intelligent Radio Frequency Identification Processing at the Edge, 2005, pp. 1-9.
Connecterra, "Four Challenges", 2004, pp. 1-7.
Connecterra, "Establishing the Foundation for Enterprise-Scale RFID Deployments", www.connecterra.com/products/rftagaware.php, Sep. 2005, pp. 1-2.
Connecterra, "ConnecTerra Product Family", www.connecterra.com, 2005, pp. 1-2.
Connecterra, "RFTag Aware™ Enterprise Server, Centralized EPC Data Management and Reporting for Enterprise-Scale RFID Deployments", www.connecterra.com, 2005, pp. 1-2.
Iautomate.com, "Installation Manual R500HA Long Range RFID Reader", www.iautomate.com, 2005, pp. 1-40.
Reynolds and Weigand, "Design Considerations for embedded software-defined RFID Readers", Emerging Wireless Technology/ A Supplement to RF Design, Aug. 2005, pp. 14-15.

Miller, "Why UWB? A Review of Ultrawideband Technology", National Institute of Standards and Technology, DARPA, Apr. 2003, pp. 1-72, Gaithersburg, Maryland.
Miller, "Wireless Technologies and the SAFECOM SoR for Public Safety Communications", National Institute of Standards and Technology, 2005, pp. 1-68, Gaithersburg, Maryland.
Chon et al., "Using RFID for Accurate Positioning", Journal of Global Positioning Systems, vol. 3, No. 1-2: pp. 32-39, Feb. 3, 2005.
Okabe, "A Car Navigation System Utilizing a GPS Receiver", 1993 IEEE, Mar. 1993, pp. 278-279.
Philipose et al., "Mapping and Localization with RFID Technology", Intel Research White Paper, Dec. 2003.
Kulyukin et al., "RFID in Robot-Assisted Indoor Navigation for the Visually Impaired", Research Paper, Utah State University, Feb. 2004.
Trolley Scan, "Issues on range and accuracy of RFID-radar™ system", RFID-radar accuracy report, pp. 1-4, Feb. 2006.
Patwari et al., "Locating the Nodes", IEEE Signal Processing Magazine, pp. 54-69, Jul. 2005.
Gustafsson et al., "Mobile Positioning Using Wireless Networks", IEEE Signal Processing Magazine, pp. 41-53, Jul. 2005.
Sun et al., "Signal Processing Techniques in Network-Aided Positioning", IEEE Signal Processing Magazine, pp. 12-23, Jul. 2005.
Sayed et al., "Network-Based Wireless Location", IEEE Signal Processing Magazine, Jul. 2005, pp. 24-40.
Nakatsuka et al., "Automotive Semiconductor Technologies in the ITS Era", Hitachi Review vol. 48, No. 6, 1999, pp. 328-332.
Cavedon, "Developing a Conversational In-Car Dialog System", Research Paper, pp. 1-11.
Mohan, "Adapting Multimedia Internet Content for Universal Access", IEEE Transactions on Multimedia, vol. 1 No. 1 Mar. 1999, pp. 104-114.
Florescu, "Performance Modelling and Analysis Using POOSL for an In-Car Navigation System", Boderc Project Paper, pp. 1-8.
Hunt, "Some Experience in In-Car Speech Recognition", Dragon Systems UK Research & Development, pp. 4/1-4/9, England.
Kun, "A Software Architecture Supporting In-Car Speech Interaction", 2004 IEEE Intelligent Vehicles Symposium, Jun. 14-17, 2004, pp. 471-476, Italy.
Turner, "Evaluating the Project 54 Speech User Interface", pp. 65-68.
Zijderhand, "A Dynamic In-Car Navigation System with Cellular-Radio Based Bi-Directional Communication Facility", IEEE, VNISCP, 1994, pp. 543-546.
Connecterra, "RFTag Aware™ Enterprise Server, Centralized EPC Data Management and Reporting for Enterprise Scale RFID Deployments", www.connecterra.com, 2005, pp. 1-2.
Mohan, "Adapting Multimedia Internet Content for Universal Access", IEEE Transactions on Multimedia. vol. 1 No. 1 Mar. 1999, pp. 104-114.

* cited by examiner

NAVIGATION SYSTEM AND METHODS FOR ROUTE NAVIGATION

BACKGROUND

Global Positioning System (GPS) car navigation systems use satellites to determine the location of the car on a map and to provide route-planning and navigation guidance, thereby avoiding the need for folded paper maps and printed directions. These personal assistant systems range from expensive factory pre-installed models that include a color display in the dashboard to more affordable and compact systems that can plug in the car's cigarette lighter. The man-machine interface is typically a touch-screen keypad display for inputting information and displaying maps from a database. However, push-buttons, joysticks and dials-based interfaces are also available. Most recent systems are DVD-based, as opposed to the earlier CD-based versions that required changing map CDs for different areas of the country. The user can typically select a destination from a variety of methods such as address, intersection, address book entry, and directly from the map. Most systems provide directions graphically and vocally. Some systems provide a 3-D capability, often called "bird's-eye view", which can be easier to read than a 2-D map. Most navigation systems also automatically display locations of points of interest such as airports, hotels, gas stations, movie theaters, restaurants, banks and other businesses. These points of interest locations can serve as possible destinations.

One of the problems with navigation systems, however, is that the entry of a new address is often a tedious and lengthy process, during which the car has to be in park mode for safety reasons. Another problem is that the map databases and points of interest can get out of date because DVD/CDs are not updateable. The map displays are also drawings with street names as opposed to realistic images of surrounding buildings. The navigation's audio as well as Bluetooth-enabled playback of cellular calls on the car's speakers is also annoying to passengers who want to sleep or listen to uninterrupted music, radio, video, etc.

With the proliferation of cellular handsets and introduction of GPS-enabled cellular phones it is now also possible to use such handsets together with a cellular GPS navigation service to get directions. For example, Nextel offers its subscribers Motorola's ViaMoto service. The cell phone user launches an application on the Nextel handset and types in the address of the destination. The service then uses GPS and Nextel's network to send driving directions to the handset. Google has also released a version of Google Maps Mobile for devices like the Palm Treo line of smartphones, Research In Motion's BlackBerries, and many Java-capable phones from Nokia, Motorola and Sony Ericsson. Additional services can also be provided such as traffic accident alerts, weather forecasts, points of interest, merchant pricing and sales information, sharing one's location with trusted people, etc. Cellular-based GPS systems have some disadvantages, however. Entering addresses into a mobile handset is difficult because it often requires pressing a number a few times to enter the correct letter. Cellular carriers' navigation systems are also not as comprehensive as portal web sites such as Yahoo and Google. The display of a typical cell phone is also much smaller than that of in-car navigation systems for display of maps and directions. More importantly, if the network coverage is lost then the navigation or map application does not work for mobile-station assisted GPS phones (i.e. phones which send their raw GPS measurement data to a server on the internet for processing, as opposed to mobile-station based phones which run the navigation layer themselves). Web searches and advertising inside a GPS-enabled car or cell phone also does not utilize the information about the position of the car/phone. Existing navigation systems use only map data but do not include up-to-date traffic and weather report information and can thus lead the user to traffic jam areas.

Thus, there remains a need for a navigation system that is capable of downloading and synchronizing address or other contact information, calendar data, map data, and other data or information from cell phones, PDA's or web site portals.

One of the main impediments to using car navigation systems (or any other moving object for that matter) is the tedious and long process of entering destination addresses on touch-screen keypad displays. Using voice commands to enter an address is also not easy because the recognition engine has to get all parts of an address (street name, number, city, state, and zip code) correct in the typically noisy car environment. However, we often have access to many addresses in various address books on internet web sites such as Yahoo! Address Book on PDAs and cell phones. For example, Palm offers convergence devices that are phones as well as PDAs with contact and calendar functionality. Such devices also come with synchronization software that will compare contacts and appointments on the device with those on a central database and keep them in agreement.

Generally, navigation systems allow manual entry and storage of a limited number of addresses. However, manual entry of destination addresses and manipulating dials while driving often decreases the driver's ability to drive safely. Because of this liability, navigation systems may not allow manual entry of addresses if the car is in motion. Speech interfaces allow drivers to keep their hands on the wheel and minimize driver distraction. Speech interfaces have been introduced into a number of automobiles for navigation and entertainment systems (e.g., see M. J. Hunt, "Some experience in in-car speech recognition", IEEE Colloquium on Interactive Dialogue Systems for Telephony Applications, 1999; and A. L. Kun, W. T. Miller III, A. Pelhe, R. L. Lynch, "A software architecture supporting in-car speech interaction", IEEE Intelligent Vehicles Symposium, Jun. 14-17, 2004, pp. 471-476). These speech systems are not natural conversational speech processing but instead resemble voice buttons that are based on a fixed grammar for particular task domains. This is sufficient for navigation applications where the task are well defined such as looking up addresses, finding points of interest, and route planning. However, the proposed method can also be used with natural language processing engines (e.g., see L. Cavedon et. al., "Developing a Conversational In-Car Dialog System", In the 12th International Congress on Intelligent Transportation Systems, San Francisco Calif., USA, 2005).

There are two types of GPS-enabled phones. Most of today's GPS-enabled phones are mobile-station assisted. These phones take their raw GPS measurements (e.g., pseudo ranges, pseudo Doppler, time, etc.) and send them to a server on the internet for calculating values such as position and velocity. The GPS functionality of these phones will not work if their cellular network coverage is lost because they will no longer be able to connect to the internet. Some of the next generation phones, however, will be mobile-station based where they have their own GPS receiver that runs the navigation layer for processing the raw measurements. The GPS functionality of these phones will work even if their cellular network coverage is lost.

While speech interfaces reduce driver distraction they do not ease the tedious address entry problem. Even with a speech interface the user still has to specify each part of the address (state, city, zip code, street, number) separately and wait for the car's text to speech engine to repeat back the entry for confirmation.

Conventional methods for client location-based advertising use IP addresses, registered addresses/zip codes and telephone numbers. All of these have limitations. Dynamic IP addresses limit the use of fixed IP address methods. The registered address/zip code and phone number of a mobile user do not indicate his/her current location. Furthermore, these methods (IP addresses, addresses/zip codes and telephone numbers) cover large geographical areas and do not provide the fine location accuracy provided by GPS systems. GPS provides positional coordinates in terms of longitude, latitude, and altitude. Addresses may also be specified by users in terms of postal codes.

The present invention provides systems and methods for improved GPS navigation.

SUMMARY

Embodiments of the present invention include systems and methods for providing improved navigation.

According to one embodiment, the present invention is directed toward a method of providing improved navigation. The method includes transmitting a destination to a navigation server through a wireless communication channel. The method further includes transmitting position information from a GPS-enabled device to the navigation server through the wireless communication channel automatically at a time interval. The method further includes generating, by the navigation server, navigation information. The navigation information is based on the position information and the destination. The method further includes receiving navigation information on the GPS-enabled device from the navigation server through the wireless communication channel.

According to another embodiment, the present invention is directed toward an apparatus including a system for improved navigation. The system includes a GPS module, a wireless communication module, and an output module. The GPS module determines position information. The wireless communication module transmits a destination to a navigation server, transmits the position information to the navigation server automatically at a time interval, and receives navigation information from the navigation server. The output module that outputs the navigation information.

As part of the above system, a cellular telephone can interface between a GPS device and a navigation system to provide up-to-date navigation information.

These and other features of the present invention are detailed in the following drawings and related description.

DETAILED DESCRIPTION

Described herein are techniques for navigation system and methods. In the following description, the terms "car navigation", "vehicle navigation", "handheld navigation", and "navigation system" are used. These terms are to be considered to interchangeably refer to a car navigation system, a vehicle navigation system, and a handheld navigation system. The particular choice of a specific term is not meant to exclude the other terms, but is to be considered an example of a specific embodiment.

In the following description, the term "Bluetooth" is used. "Bluetooth" is a radio standard and communications protocol primarily designed for low power consumption with a short range. The Bluetooth standard may also be referred to as the IEEE 802.15.1 standard. For brevity, the term "Bluetooth" is used, and should be understood to refer both to the IEEE 802.15.1 standard specifically as well as other types of low power, short range communications protocols. For example, the term "Bluetooth module" is used (for brevity) to refer to a short range low power communications module.

For purposes of explanation, numerous examples and specific details are set forth in order to provide a thorough understanding of the present invention. It will be evident to one skilled in the art that the present invention as defined by the claims may include some or all of the features in these examples alone or in combination with other features described below, and may further include modifications and equivalents of the features and concepts described herein.

Figure 1:
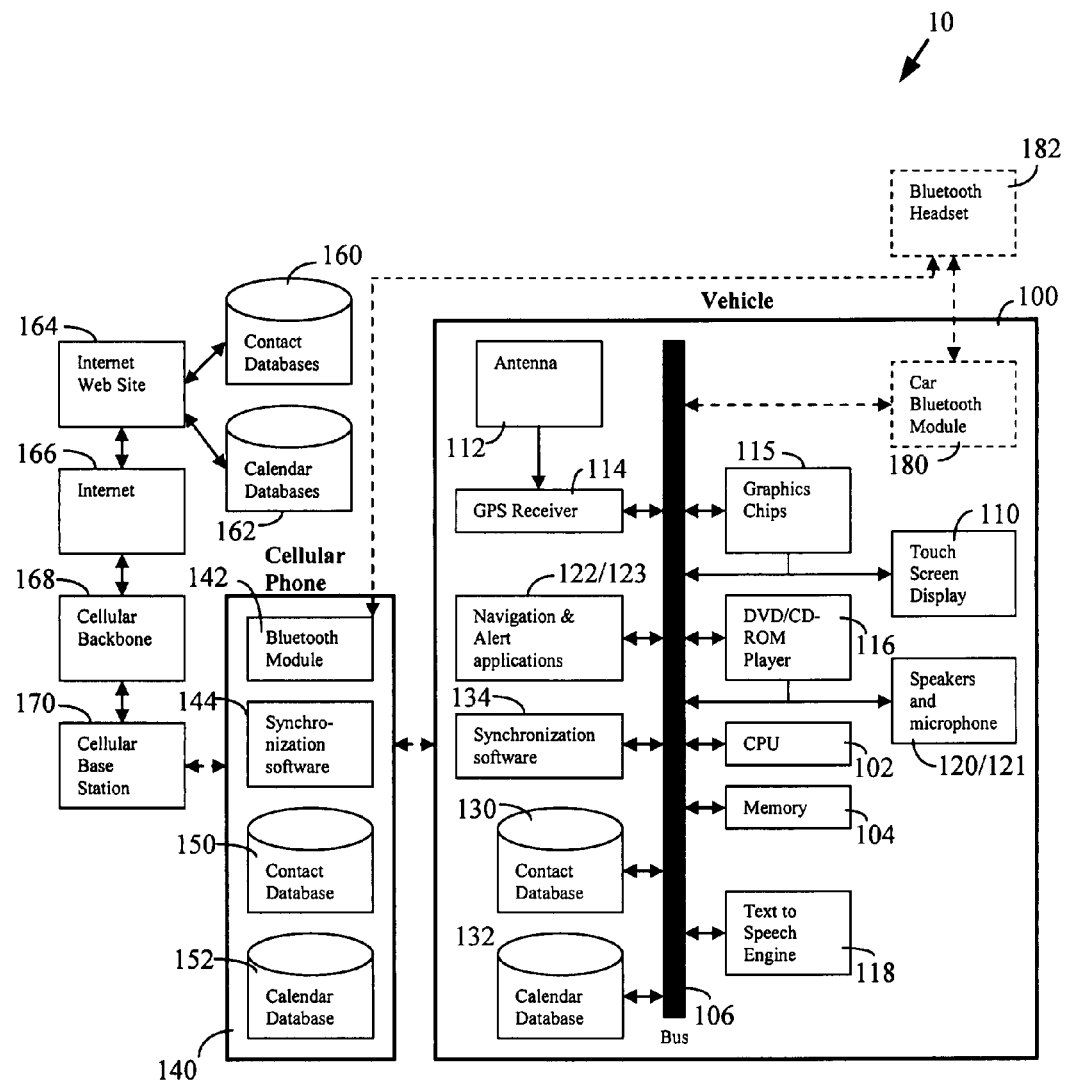
FIG. 1 illustrates a touch-screen menu-based vehicle navigation system according to one embodiment of the present invention.

I. Touch-Screen Car Navigation System Using Contact Address Book and Calendar Information from a Web Site or a Cellular Phone FIG. 1 illustrates a touch-screen menu-based vehicle navigation system according to one embodiment of the present invention. Vehicle navigation system 10 includes antenna 112, GPS receiver 114, DVD/CD-ROM player 116, touch-screen display 110, graphics chip 115, text-to-speech engine 118, speakers 120, microphone 121, navigation application 122, alert generation application 123, synchronization software 134, contact database 130, calendar database 132, CPU 102 and memory 104. Other elements shown in FIG. 1 are described in other figures, with corresponding elements having the same element number.

In one embodiment, calendar database 130 may be combined with alert generation application 123 to remind the user about upcoming appointments and tasks. These appointments and tasks may be integrated with navigation application 122. For example, the navigation application may be able to inform the user of meeting with John Smith in 30 minutes and include a planned route shown on the display. It should be noted that the address book, calendar, and alert application are independent of the navigation and guidance system and can be used for other applications as well (e.g. making phone calls).

Navigation system 10 may have a large permanent database for storing contact information that includes the contact's address as well as other pertinent information. Pertinent information may include contact name, job title, work address, company web site, work phone, work email, home address, personal email, home phone, messenger ID, personal web site, picture, birthday, comments, and custom information. In one embodiment, the latest contact information database as well as the calendar database can be seamlessly loaded into the vehicle with use of synchronization software 134. A user may download address books from internet web sites and/or mobile devices into the vehicle and synchronize them with existing contact information. In one example, contact database 160 and calendar database 162 may be downloaded from internet web site 164 to the cellular phone and synchronized with contact database 150 and calendar database 152. In another example, contact database 160 and calendar database 162 may be downloaded from internet web site 164 to the vehicle and synchronized with contact database 130 and calendar database 132. The user may also recall an address with the use of keyword association. For example, selection of the contact name "John Smith" in the contact database of the vehicle retrieves the stored contact information. This contact information may include his address and phone number. Single touch screen buttons on the navigation unit such as "Find route to work address" or "Call work" may be used to perform common tasks with the stored contact information. In other embodiments of the present invention, these commands may be replaced with voice commands.

The synchronization step may include downloading the latest database from the SIM card or memory of a mobile device such as a cell phone or PDA that is in the driver's pocket, briefcase, or car's glove box compartment. For example, contact database 150 and calendar database 152 maybe downloaded from the cellular phone to the vehicle and synchronized with contact database 130 and calendar database 132. In one embodiment, only the delta changes since the last synchronization are downloaded. The communication between the mobile device and the car can be wireless with technologies such as Bluetooth, Wireless LAN, Ultra-Wide-Band (UWB), WiMax, Zigbee, or other ad-hoc/mesh network technologies. The communication may also be via a patch cord or other wired connection. In another embodiment, the synchronization step includes downloading address and contact information from internet web sites. In one example, address and contact information is downloaded from Yahoo! Address Book and Yahoo Calendar. In one embodiment, the mobile device is used as an intermediary to log into the web site, download the latest databases, and transmit the information wirelessly to the car. Some vehicles may also include integrated cellular phones to be used as either the source of the contact information for download or as an intermediary to connect to the internet web sites. Some vehicles' GPS receivers may have wireless connectivity with integrated WLAN, Bluetooth, WiMax, and 3G/4G cellular radios. Such vehicles may connect directly to cellular base station 170 (or other types of base stations like WLAN, WiMax) and Internet 166 without having to use a cellular phone 140 as an intermediary router. For addresses of interest which are not in any of the databases, data entry of the addresses may be simplified by entering the addresses into an internet web site's database on a desktop computer through a conventional size keyboard and then downloading them to the phone or the vehicle.

The synchronization step may be necessary if there has been a change to the contact databases. In one embodiment, synchronization may be initiated via a menu command button on the phone. In another embodiment, synchronization may be programmed as an automatic background process that does not require any action by the user. Synchronization may also be bi-directional. Most address books and calendar programs provide an export functionality that may generate a Comma Separated Value (.CSV) file, html/xml file, or some other format. Likewise, data may be imported to the address books and calendar programs through the same format. Therefore, if new contacts or calendar events have been entered directly into the vehicle, then the synchronization step may also make those entries available on the cellular phone or the internet web site by exporting them from the vehicle.

Figure 2A:
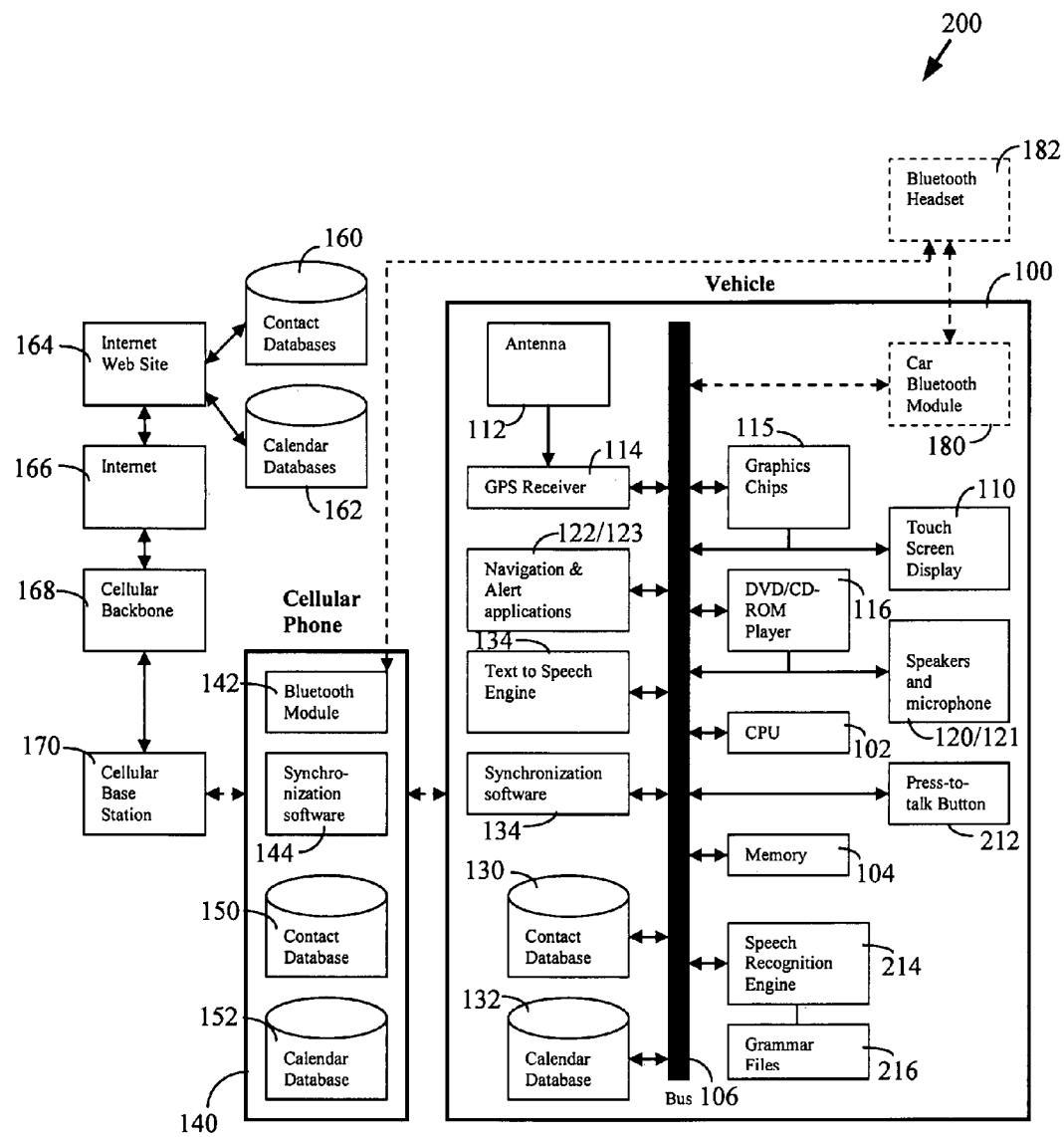
FIG. 2A illustrates a vehicle navigation system interacting through speech interface according to one embodiment of the present invention.

II. Speech Interface Car Navigation System Using Contact Address Book and Calendar Information from a Web Site or a Cellular Phone FIG. 2A illustrates a vehicle navigation system interacting through speech interface according to one embodiment of the present invention. Combining a speech interface with address book and calendar databases may be used to avoid manual address entry in the car whenever possible. Vehicle navigation system 200 includes microphone 121, speech recognition engine 214, grammar files 216, and press-to-talk button 212. Different grammar files can be loaded by the speech recognition engine based on the context of the previous commands. For example, if the user is at the stage of using speech to enter the street number of an address then the grammar file containing alphanumeric characters (26 letter plus numbers from 0 to 9) is used. The other elements are as described in FIG. 1 and the remaining figures.

Below is an example interaction where the driver initiates the conversation and the vehicle provided feedback to the driver:

Driver: "Audio on"
Car: "Audio is on"
Driver: "Find route for John Smith office"
Car: "Route found"
Driver: "Proceed with route"
Car: "Guidance information . . . "
Driver: "Zoom"
Car: "Zoomed the map"
Driver: "Call John Smith at office"
Car: "Calling John Smith at office"
John Smith: "Hello"
Driver: "Hello, it is me. I am on my way".

In another example, the driver initiates the conversation and performs a search for contact information where multiple contacts are found:

Driver: "Audio on"
Car: "Audio is on"
Driver: "Find John"
Car: "Multiple Contacts Found. Select from John Doe, John Smith, John Black"

Driver: "'Find route for John Smith office"
...
In another example, an appointment reminder is triggered through the car's calendar application and the user may choose to use the appointment location as the destination:
Car: "Appointment to see John Smith at office in 30 minutes",
Driver: "Proceed with route"
...
In another example, the driver initiates a synchronization of the contacts:
Driver: "Synchronize contacts"
Car: "Synchronize contacts succeeded"
In another example, the driver initiates a synchronization of calendar information:
Driver: "Synchronize calendar"
Car: "Synchronize calendar succeeded"
In one embodiment, the speech recognition may accept point of interest commands such as "Show all restaurants." In this example, the command may display all restaurants nearby with icons that, when selected, show more details like phone numbers, web sites, menus, route information, etc. The points of interest information resemble the yellow pages and include information such as addresses and phone numbers. This information may be stored on the digital map DVD/CD of the navigation database. Additional information may also be available via a GPS subscription service. The driver can then pick a point of interest location and make a hands-free-call with the built-in speaker/microphone and a cell phone that communicates with the car's GPS systems. In one example, the cell phone communicates with the GPS system through a Bluetooth communication channel. In another example, the communication is through a wireless communication method such as WiMax. In one embodiment, a vehicle's GPS receiver may have wireless connectivity with integrated WLAN, Bluetooth, WiMax, and 3G/4G cellular radios, thereby allowing them to connect directly to the cellular base station 170 (or other types of base stations like WLAN, WiMax) and Internet 166 without having to use cellular phone 140 as an intermediary router. A sample restaurant point of interest dialog is illustrated below:
Driver: "Show all restaurants"
Car: "Restaurants are displayed"
Driver: "Call McDonald's"
Car: "Calling McDonald's"
McDonald's: "Hello. This is McDonald's. May I help you"
Driver: "Hi, I would to order a big Mac"
...
In another embodiment, the voice recognition engine can also be used by other applications. For example, the driver can use voice commands for setting the car's temperature: "Set temperature to 77".
The dashed lines in FIG. 2A show another embodiment of the present invention wherein the driver of the vehicle may wear Bluetooth-equipped headset 182. The headset may also be some other wireless technology or a wired headset. The touch-screen interface of the navigation system may offer a menu option that allows the driver to choose to connect the navigation's sound to the headset as opposed to the vehicle's speaker system. In one embodiment, communication between vehicle 100 and headset 182 may allow the audio commands from the car navigation system (e.g., "Turn left at the next intersection") to be transferred to the headset, thereby preventing the audio commands from disturbing other passengers in the car. Passengers can then sleep or listen to music, radio, video, etc, without constant audio interruptions by the car navigation system. In another embodiment, headset 182 may be used to connect with cellular phone 140 so that received cellular audio is only heard by the person wearing the headset.

Figure 2B:
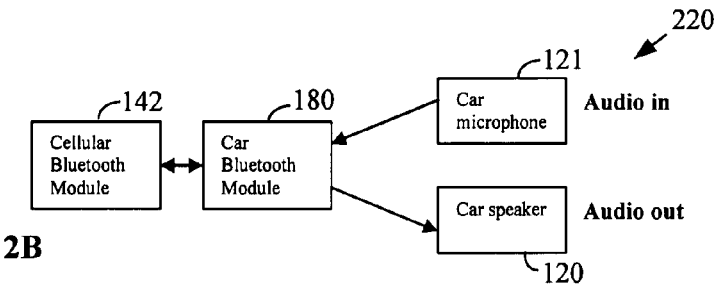
FIG. 2B illustrates a hands-free cellular operation in a bluetooth-enabled vehicle.

FIG. 2B illustrates a hands-free vehicle navigation system in a Bluetooth-enabled vehicle. System 220 comprises cellular Bluetooth module 142 communicating with car speaker 120 and car microphone 121 through car Bluetooth module 180. In the upstream path, the driver's voice is received by car microphone 121 and is translated to the cellular Bluetooth module through the car Bluetooth module. In the downstream path, audio received by the cellular phone from the cellular network is transmitted to the car speaker through the car Bluetooth module.

Figure 2C:
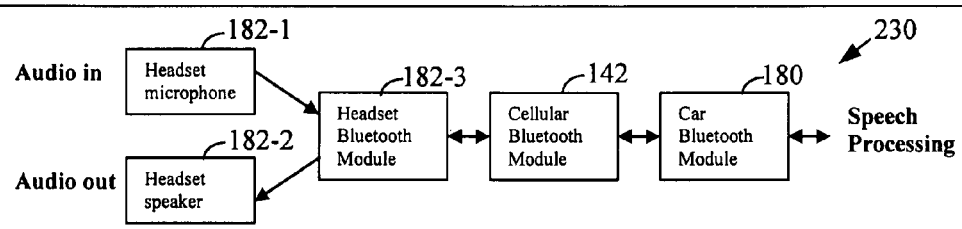
FIG. 2C illustrates the hands-free vehicle navigation system of FIG. 2A having a headset use for speech control of a car's navigation, temperature, audio-visual equipment, etc.

FIG. 2C illustrates a hands-free vehicle navigation system according to one embodiment of the present invention. System 230 comprises headset module 182-3 communicating with cellular module 142 through a Bluetooth connection. The person using the cellular phone may talk to headset microphone 182-1, as opposed to the car's microphone. The user may also receive the cellular audio on headset speaker 182-2, as opposed to the car's speakers. This may provide more privacy since the received audio is not played on the car's speakers. It also improves the transmitted audio quality since the headset is usually placed on the ear so its microphone is closer to the mouth than the car's microphone. System 230 also comprises a Bluetooth connection between cellular module 142 and the car module 180. Thus, speech commands from the driver may go from the headset, through the cellular phone and into the car's speech processing unit. In one embodiment, the speech commands may be used to control the car's navigation, temperature, or audio-visual equipment. For example, if the command was to "Set temperature to 70 degrees," then the car's response "Setting temperature to 70 degrees" may go from the car through the cell phone to the headset. If the driver wants to give another command, she may need to signal it using a key phrase or with the press-to-talk button. The previous examples illustrate that the cell phone is not required in the loop unless cellular calls are involved.

Figure 2D:
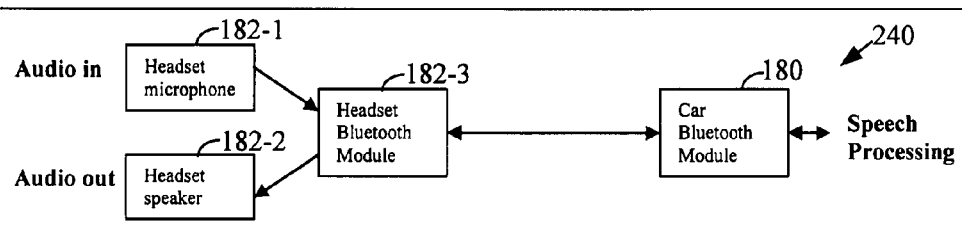
FIG. 2D is a schematic diagram illustrating the navigation system of FIG. 2A using a headset for speech control of a car's navigation, temperature, etc.

FIG. 2D illustrates a hands-free vehicle navigation system according to one embodiment of the present invention. System 240 may communicate commands and responses from headset 182-3 to car module 180. Such commands and responses may be used for car navigation or temperature control. Commands may be sent through headset microphone 182-1 and processed by the car's speech processing engine to control the car navigation, temperature, etc. The car's audio responses may be relayed from car module 180 to the headset speaker 182-2.

Figure 2E:
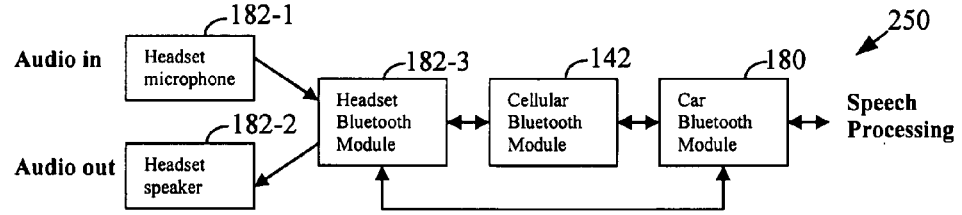
FIG. 2E is a schematic diagram illustrating the navigation system of FIG. 2A using hybrid approach where commands and responses go through the direct Bluetooth connection between the headset and the car.

FIG. 2E illustrates a hands-free vehicle navigation system according to one embodiment of the present invention. System 250 illustrates a hybrid approach between FIG. 2C and FIG. 2D. Commands and car responses may go through the Bluetooth connection between headset module 182-3 and car module 180. Phone operations such as dialing a person may go through the Bluetooth connection between car module 180 and the cellular module 142.

III. GPS-Enabled Cellular Phone Using Internet Web Sites for Route Guidance

Figure 3:
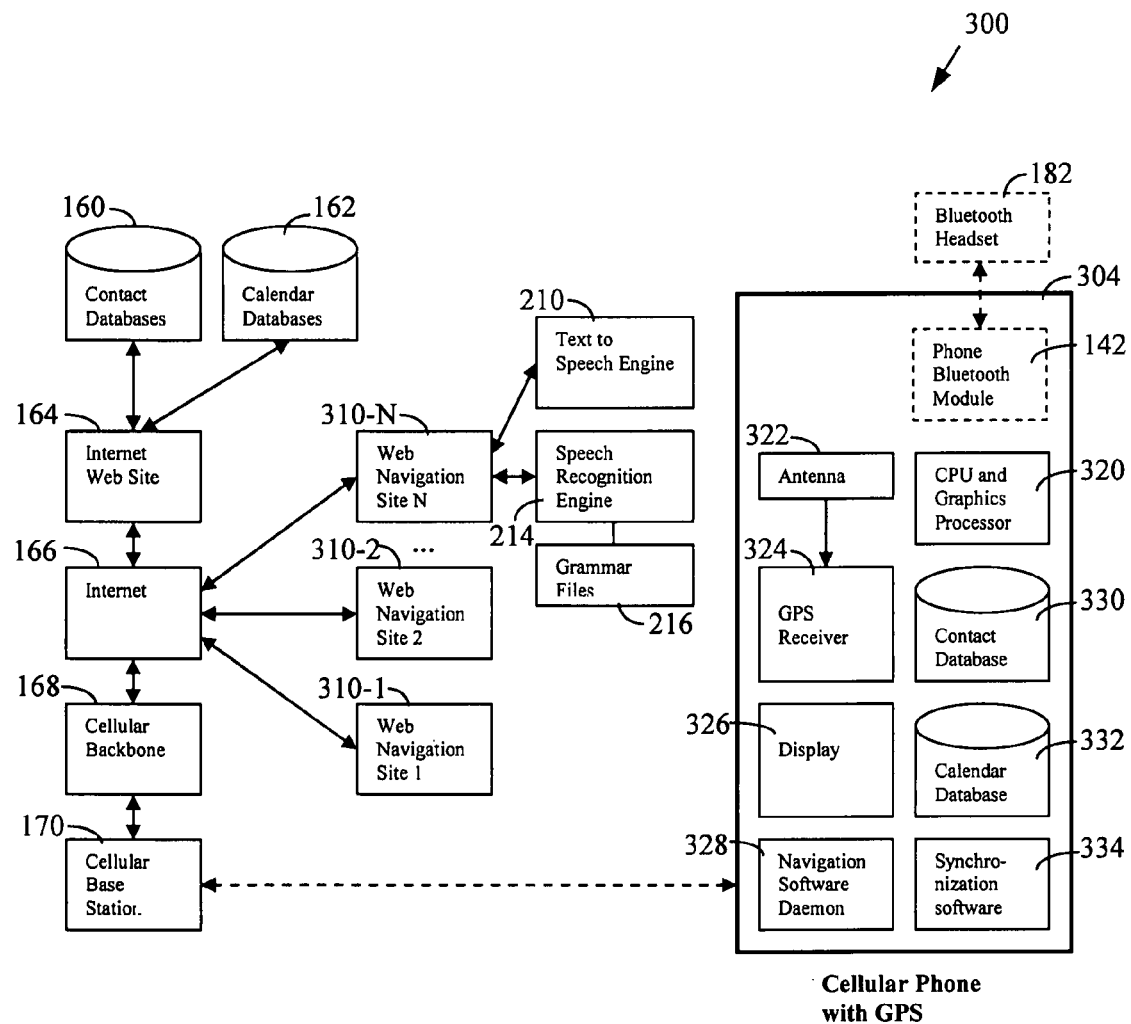
FIG. 3 is a schematic diagram illustrating a GPS-enabled cellular phone using internet web sites (independent of the cellular service provider's navigation service) for route planning and guidance.

FIG. 3 illustrates a navigation system according to one embodiment of the present invention. GPS-enabled cellular handset 304 may receive route guidance from navigation web sites 310-1 to 310-N. Cellular handset 304 may launch navigation software daemon 328 that uses a browser on the cell phone to communicate with a navigation web site on the internet. The software daemon 328 may communicate with the internet through cellular base station 170 and cellular backbone 168. The daemon 328 may have different modes of operation including a map mode and a navigation mode. In the map mode, the daemon 328 may send the GPS coordinates from the GPS receiver 324 of the cell phone 304 to the web site 310, and the web site 310 may return a map with the location of the cell phone 304 marked. In one embodiment, the daemon 328 may continue to send the GPS coordinates of the cell phone 304 at regular time intervals to the web site 310 and the web site 310 may reply with updates of the map and the cell location. Thus as the cell user moves, the location displayed on the map may be updated. The user can also interact with the map (e.g., scroll and zoom) by sending commands back to the web site and receiving responses.

In the navigation mode, the cell phone user may provide the daemon 328 with a destination address. In one embodiment, the address may be provided from the address book stored on the phone or on an internet web site. In one example embodiment, addresses from contact database 160 and calendar database 162 stored on internet website 164 may be accessed by cellular device 304. In one embodiment, the address may be provided by clicking on a point on the map or by manually entering the address on a keyboard. The daemon 328 may send the address to a web navigation site 310 which in turn calculates a route and replies back with a map containing the route marked. In one embodiment, the daemon 328 may continue to send the GPS coordinates of the cell phone 304 at regular intervals to the web site 310 and the web site 310 may reply with map updates, the cell phone location, and the guidance information. In one embodiment, web navigation sites 310-1 through 310-N may contain speech recognition engines and grammar files. In one example, web navigation site 310-N contains text to speech engine 210, speech recognition engine 214, and grammar files 216. Thus, the cell phone user may interact with the navigation sites 310 using voice, and the navigation site may supplement the maps with voice responses.

Because system 300 is a thin-client model where the cell phone 304 sends requests to the servers of the navigation web sites 310 and displays the results, large computations and the associated power consumptions are relieved from the cell phone 304. The reception quality of the wireless communication link may not be critical because the transfer is mainly data. One advantage of using a web site for navigation is that the latest maps are always accessible, as opposed to DVD/CD maps that are not updatable. Furthermore, web sites also offer the advantage of a single integrated portal location for carrying out several tasks (e.g. searching for a business such as a particular restaurant, getting its coordinates, and then getting directions for it). These portal web sites can also provide targeted advertisement to the cell phone that is related to the user's destination query. Thus, system 300 frees the cellular user from having to use the navigation service of their cellular provider and instead gives them the freedom to use more popular portal web sites such as Google, Yahoo, etc.

In one embodiment, the cell phone 304 may download a partial map of the area of interest, thereby caching information on the cellular phone 304. This may decrease the communication with the navigation server for small scroll or small zoom requests. In one embodiment, the latest maps and the navigation application may be downloaded from the navigation server 310 or reside on the cell phone 304 to begin with. Thus, there is no need to contact the navigation web server 310 repeatedly. This is known as a fat-client model.

Figure 4:
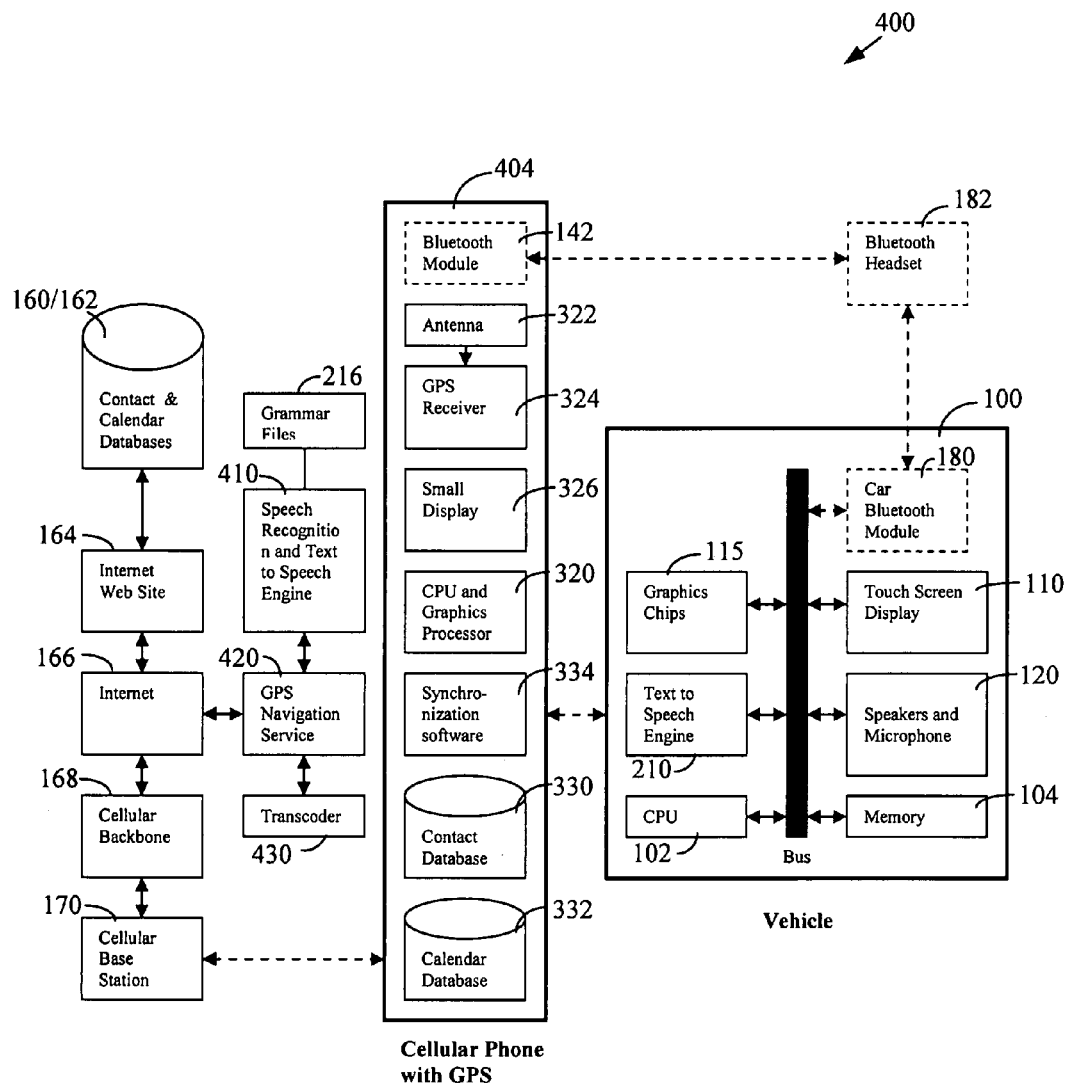
FIG. 4 is a schematic diagram illustrating a GPS-enabled cellular phone using a Web GPS navigation service and the larger touch-screen display of the car. The transcoder may be located in the internet GPS navigation service, the cell phone, or the car.

IV. GPS-Enabled Cellular Phone Using a GPS Navigation Service and the Larger Touch-Screen Display of the Car FIG. 4 illustrates a navigation system 400 according to one embodiment of the present invention. System 400 comprises GPS-enabled cellular phone 404 using GPS navigation service 420 to display navigation information on touch-screen display 110. Displaying navigation information on touch-screen display 110 may be easier to read than the small screen 326 on cell phone 404. This may translate to a safer method of using the navigation system 400. In one embodiment, touch-screen display 110 is located within vehicle 100 that does not contain a navigation system. In one example, this touch-screen display 110 is located in the dash board of the vehicle 100.

The content produced by the internet-based navigation service 420 for the display 326 of the cell phone 404 may be unsuitable for the larger display 110 of the vehicle 100 due to differences in display formats. Therefore, the navigation graphics may be adapted for the display capabilities of the vehicle 100, such as its screen size and color depth. This adapting which includes scaling and color depth conversion of the graphics and the text may be carried out by a transcoder (e.g., see R. Mohan, J. Smith, C.-S. Li, "Adapting Multimedia Internet Content For Universal Access," *IEEE Transactions on Multimedia*, March 1999, pp. 104-114). In one embodiment transcoder 430 is implemented within the internet GPS service provider 420. In other embodiments, the transcoder may be implemented in the cell phone or the vehicle's audio-visual system. GPS navigation service 420 may include speech recognition and text to speech engine 410. This may allow for voice activation by the user through hands-free voice commands. In one example, the voice command "Use car display" instructs the internet GPS navigation service 420 to provide adapted graphics content for the vehicle 100. In order to adapt the content, the navigation service 420 has to know the capabilities of the vehicle's display. In one example, vehicle 100 may transmit its display capabilities to cell phone 404 which in turn forwards it to navigation service 420. Cell phone 404 may then receive the adapted content and wirelessly transmits it to display 110.

In one embodiment, the car 100 may also contain a navigation system. In situations where the network coverage of the cell phone is lost, the cellular phone may transfer the destination address to the vehicle's navigation system through a short-range wireless communication (e.g. Bluetooth, WiMax, etc.) and use the vehicle navigation system instead. The transfer of the address can be initiated by pressing a button or via a voice command.

V. GPS-Enabled Vehicle Using Internet Web Sites for Route Guidance

Figure 5:
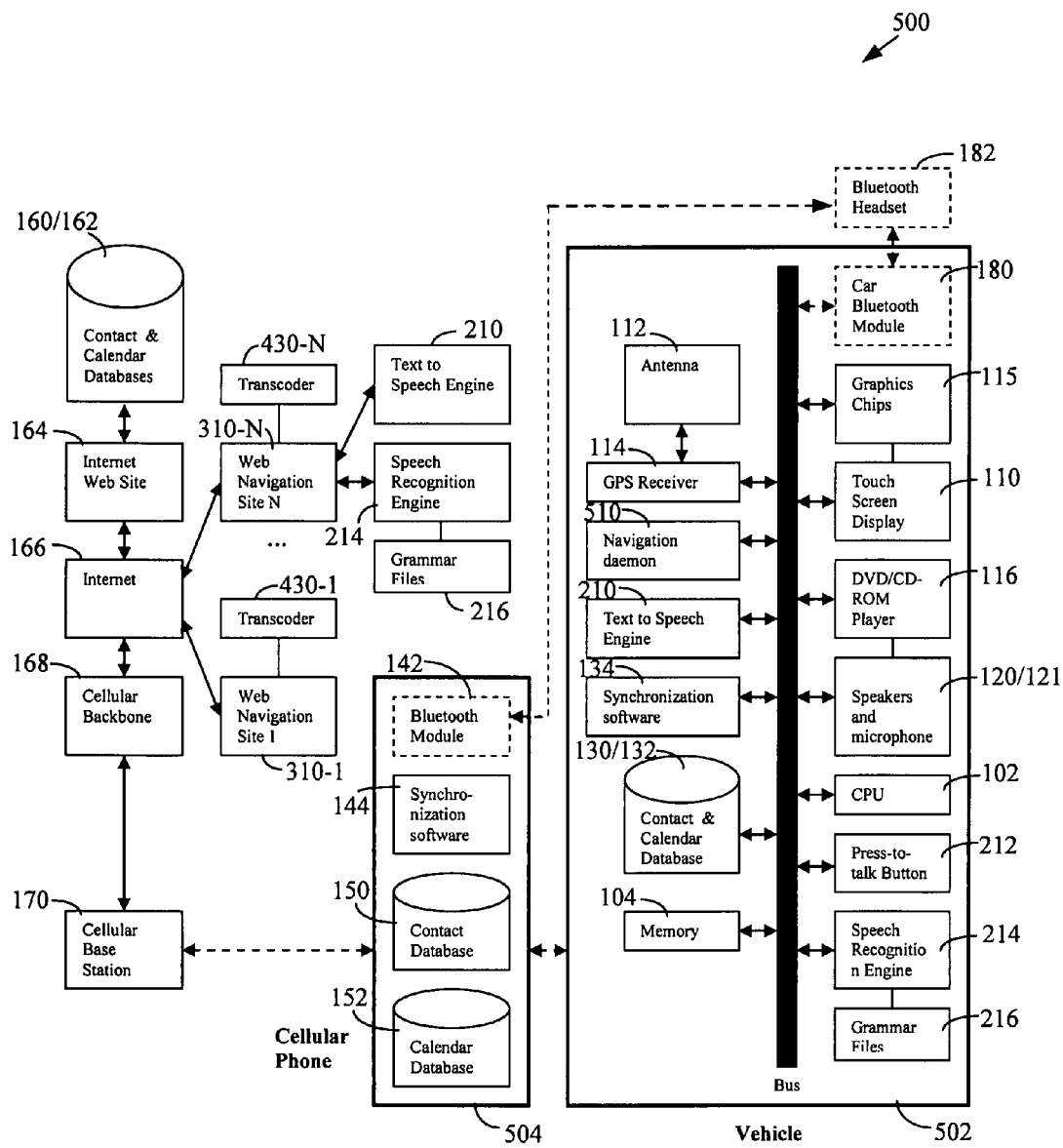
FIG. 5 is a schematic diagram illustrating a GPS-enabled vehicle using internet web sites for route planning and guidance.

FIG. 5 illustrates a navigation system 500 according to one embodiment of the present invention. System 500 includes GPS-enabled vehicle 502 that may receive route guidance from different navigation web sites 310. In one embodiment, navigation software daemon 510 may communicate with navigation web sites 310-1 to 310-N through a wireless connection with a cellular phone 504 (e.g., Bluetooth, WiMax, etc.). Thus, the cellular phone 504 acts as a network router capable of performing the tasks described in FIG. 3. In another embodiment, the GPS receiver 114 of vehicle 502 may have wireless connectivity with integrated WLAN, Bluetooth, WiMax, and 3G/4G cellular radios. This may allow the vehicle to connect directly to cellular base station 170 (or other types of base stations like WLAN, WiMax) and Internet-based web navigation site 310 without having to use cellular phone 504 as a network router.

In one embodiment, the daemon 510 has a map mode of operation. In the map mode, the daemon 510 may send the GPS coordinates of the vehicle 502 from the GPS receiver 114 to the web site 310 through the cellular phone 504. In response, the web site 310 may return a map with the location of the vehicle 502 marked. A transcoder 430 may be used by the web site 310 to return the appropriate size/color depth image for the vehicle's display 110. In one example, GPS receiver 114 has sent the GPS coordinates of vehicle 502 to web navigation web site 310-1 and the web site has returned a map that has been adjusted by transcoder 430-1 for touch screen display 110. In one embodiment, the daemon 510 may continue to send the GPS coordinates of the vehicle 502 at regular time intervals to the web site 310 and the web site may in turn update the map and the vehicle location. Thus, the location displayed on the map is updated as the vehicle 502 moves. The user may also interact with the map (e.g., scroll, zoom) by sending commands back to the web site 310 and getting back responses.

In the navigation mode, the vehicle 502 may provide the daemon 510 with a destination address. In one embodiment, the address may be provided by using the address book stored on the vehicle 502, the address book stored on the cellular phone 504, or the address book stored on an internet web site 164. In one example embodiment, addresses from contact database 160 and calendar database 162 may be accessed by internet website 164 through the cellular device 504. In one embodiment, the address may be provided by clicking on a point on the map or by manually entering the address on a keyboard. The daemon 510 may send the address to a web navigation site 310 which in turn calculates a route and sends back a map with the route marked. In one embodiment, the daemon 510 may continue to send the GPS coordinates of the vehicle 502 at regular intervals to the web site 310 and the web site 310 in turn updates the map, the vehicle location, and the guidance information. In one embodiment, web navigation sites 310-1 through 310-N may contain speech recognition engines 214 and grammar files 216. Thus, the vehicle user may interact with the navigation sites 310 using voice, and the navigation site 310 may supplement the maps with voice responses.

The use of a web site for navigation may allow for more up to date maps when compared to DVD/CD maps that are not updatable. Web sites such as Google also have the advantage that they offer a single integrated portal location for carrying out several tasks (e.g., searching for a business such as a particular restaurant, getting its coordinates, and then getting directions for it). These portal web sites can also send the vehicle targeted advertisements that are related to the user's destination query. Thus, the architecture of FIG. 5 frees the user from having to use the navigation system of the car and instead gives them the freedom to use more popular portal web sites such as Google, Yahoo, etc.

In one embodiment, the vehicle 502 may use the cell phone 504 as a router to contact an internet web navigation site 310 and download the most up-to-date maps and navigation information. Once that information is stored on the vehicle 502 there may be no need to go back to the server 310 for interactions such as scroll and zooming requests.

VI. Improved Map Display with Satellite and Hybrid Views

In one embodiment of the present invention, improved map displays capable of offering satellite and hybrid views are available in the navigation system. A user may choose between a standard map view, hybrid view, and a satellite view. The standard map view displays a drawing with streets and their names. The satellite view displays aerial imagery of streets and buildings. The hybrid view superimposes street names onto satellite images. In many ways, the satellite and hybrid views are more useful because they more closely resemble what the driver sees as he drives. Future satellite images will provide even more resolution than today, such that streets signs and other important visual cues can be more clearly visible. In one embodiment, the satellite imagery may be stored on the navigation CD/DVD. In another embodiment, the satellite imagery may be downloaded from the internet. This improved display methodology may be applied to navigation services for GPS-equipped cell-phones, as well as the displays of car navigation systems.

VII. Location Service for Keeping Track of GPS-Enabled Contacts

Figure 6:
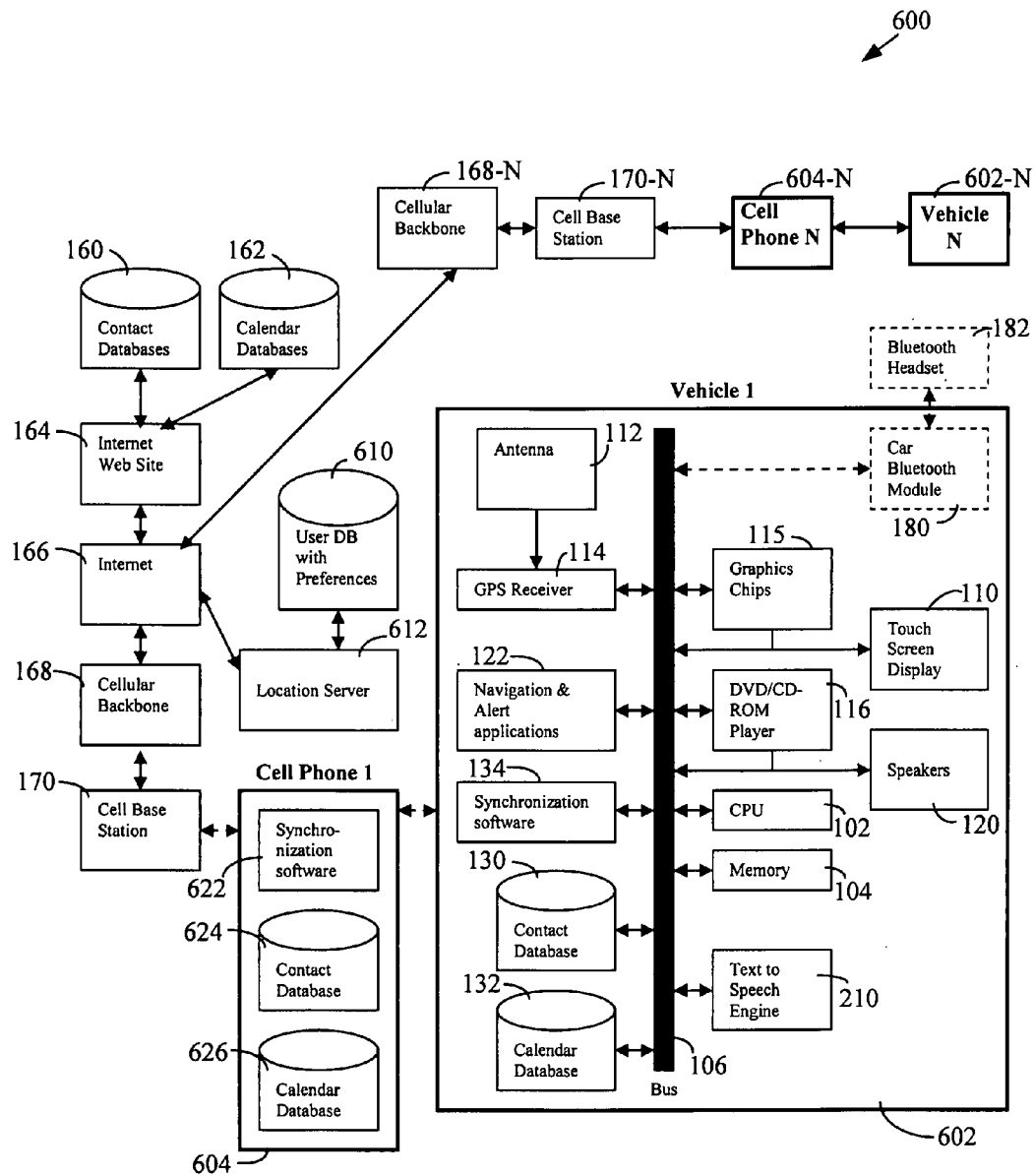
FIG. 6 is a schematic diagram illustrating a location-based service that keeps track of trusted contacts on the screen map of the car navigation service.

FIG. 6 illustrates a navigation system 600 according to one embodiment of the present invention. System 600 includes a location-based service through GPS to keep track of trusted family, friends, or contacts who are on the road. For example, the location of the vehicles belonging to a driver's trusted friends may be displayed on his own vehicle's navigation map allowing him to drive towards them if he so desires. Likewise, his friends may also see his vehicle location on their navigation maps. Location server 612 located on internet 166 may link people in a trusted group. Each vehicle 602 may regularly transmit its GPS coordinate to the cell phone 604 of the driver through Bluetooth, WiMax, or other wireless methods. The GPS coordinates may then be forwarded to location server 612 via their cellular connection to the internet 166. Therefore, the location server 612 has the location of all the vehicles. In practice, many physical servers may share this responsibility. The location server 612 may also maintain a list of trusted vehicles for each vehicle. For example, vehicle 602 can setup its preferences such that vehicle 602-N can view its location. Vehicle 602-N can then see its own location as well as that of vehicle 602 and any other vehicles that have given them permission on their navigation maps. In one embodiment, each subscriber to the location service may go through an authentication step. After a vehicle is authenticated, it can make a request to the location server 612 to view all or some of the vehicles in its trusted group. In one example, the request is manual with a touch-screen 110. In another example, the vehicles have speech recognition capability and the request is vocal with voice commands. In another embodiment, GPS receiver 114 of vehicle 602 may have wireless connectivity with integrated WLAN, Bluetooth, WiMax, and 3G/4G cellular radios, thereby allowing it to connect directly to cellular base station 170 (or other types of base stations like WLAN, WiMax) and Internet 166, and regularly transmit its GPS coordinate to location server 612 without having to use cellular phone 604 as a network router.

Elements not otherwise described are similar to the same-numbered elements detailed with reference to other figures.

In one embodiment, location server 612 may run location-based software applications that access databases of users, their authentication profiles, and preferences. This database is illustrated as database 610. The server 612 may provide a variety of web services with the information stored on database 610. In one example, in response to a request from a vehicle, the server 162 can just supply the names and space coordinates of trusted users and let the navigation system 122 of the car 602 plot those users on its map. In another example, the server 612 may provide more sophisticated services such as navigation, proximity searches, and points of interest. For example, with a voice interface the user may say "Drive to John Smith." The location server 612 may then retrieve the GPS coordinates of John Smith and pass the result to the navigation system 122 which calculates the route and proceeds with guidance.

VIII. Location-Based Web Access

Figure 7:
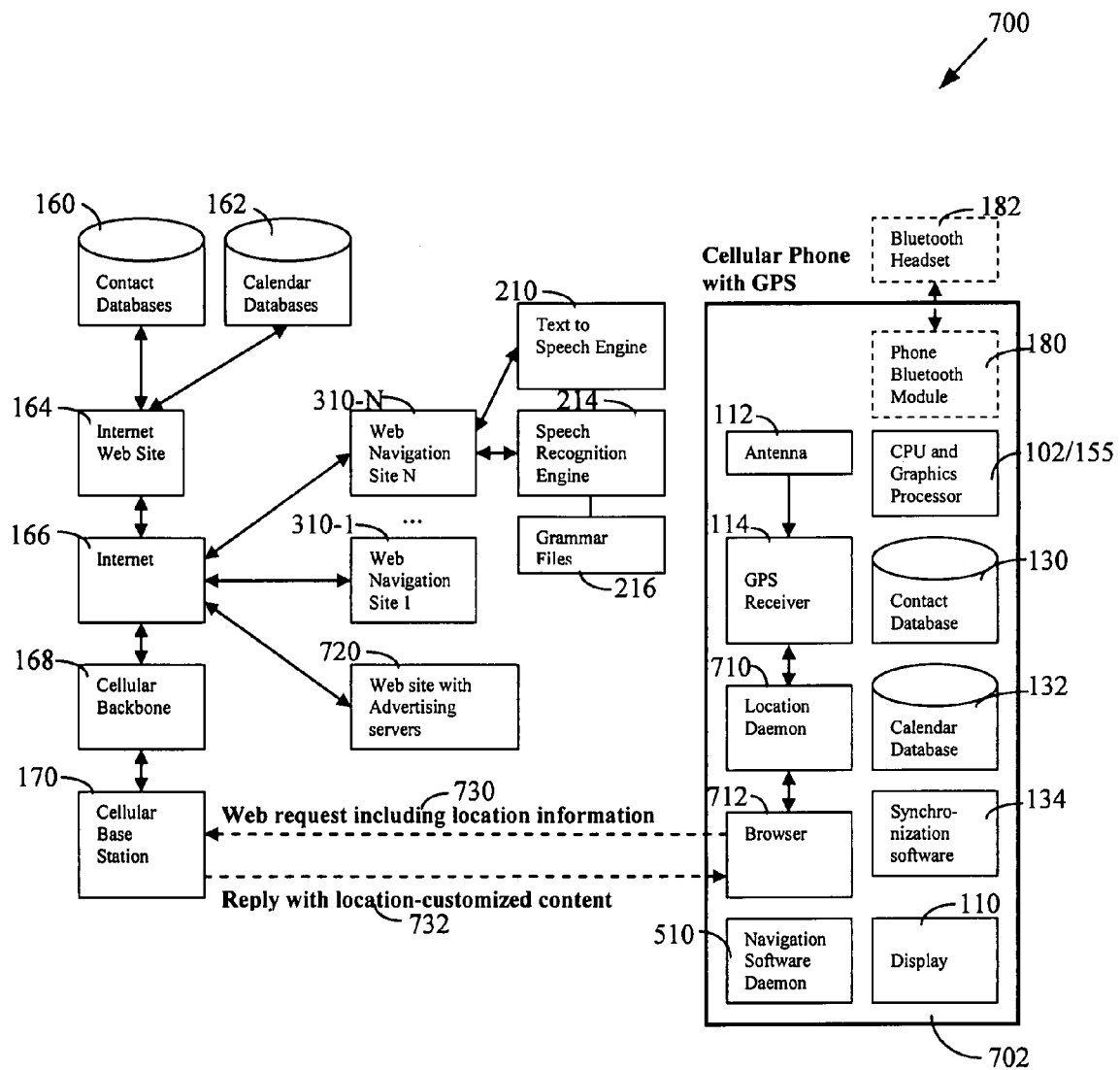
FIG. 7 is a schematic diagram illustrating a location-based architecture for a GPS-enabled cell phone.

FIG. 7 illustrates a navigation system 700 capable of location-based web services according to one embodiment of the present invention. Location-based web services may provide value-added service for electronic commerce ("e-commerce"). For example, location-based advertising may be an effective sales and marketing tool because customers are more likely to go to stores and services that are close to their location. Other examples of location-based services may include emergency services, store location finders, traffic alerts and weather reports.

GPS information provides fine granularity positional information that can be used to provide location-based web advertising for E-commerce. For example, web viewing on a GPS-enabled cellular phone may be customized by the GPS location of the cell phone client. Cellular or Wi-Max networks may also be used inside a car to access the web. In one embodiment, the car's GPS information can provide the location of the car to the web sites at regular time intervals. The web sites may respond with location-based content (e.g. search results) and advertising that may be displayed inside the car. In one example, location-based advertising can be provided about products and services from nearby businesses such as restaurants, gas stations, movie theaters, retail stores, etc.

In one embodiment, location-based services may be provided by modifying the browser on a client. The browser may be modified so that it is aware of the client's location. In one example, the browser may reside in a cellular phone. In another example, the browser is running on the car's navigation display. System 700 includes cellular phone 702 wherein the cellular phone includes browser 712 for delivery of location-based web services received from web site 720. In one embodiment, browser 712 may receive permission to open a side connection to location daemon 710. Location daemon 710 may receive the location of the client through GPS receiver 114 or other means including WLAN or RFID. The location of the client may be sent from the browser to websites through request 730. Response 732 may include content and advertising tailored for the information provided in request 730. In one embodiment, the location daemon 710 may continue to send the GPS coordinates of the cell phone at regular time intervals to the browser 712. When the browser 712 receives the GPS coordinates, the browser 712 may resend the request to the web sites 720 and receive updated responses. The responses may include updated content and advertising. In one example, the web servers 720 use XML formats such as Web Services Description Language (WSDL) to describe their web services so that the client can read the WSDL and find what functions the server 720 supports. If the user is concerned about privacy issues, permission may be denied to the browser 712 when connecting to the location daemon 710 and/or transmitting its location information to servers. The navigation software daemon 510 may provide a similar function to the combined functionality of the browser and location daemon 710 but is limited to navigation applications. Thus, its functionality could also be incorporated into the browser 712 and the location daemon 710.

The elements of FIG. 7 not otherwise discussed are similar to the same-numbered elements described with reference to FIG. 1 and other figures.

IX. Navigation System that Uses Web Information to Improve its Path Planning

Figure 8:
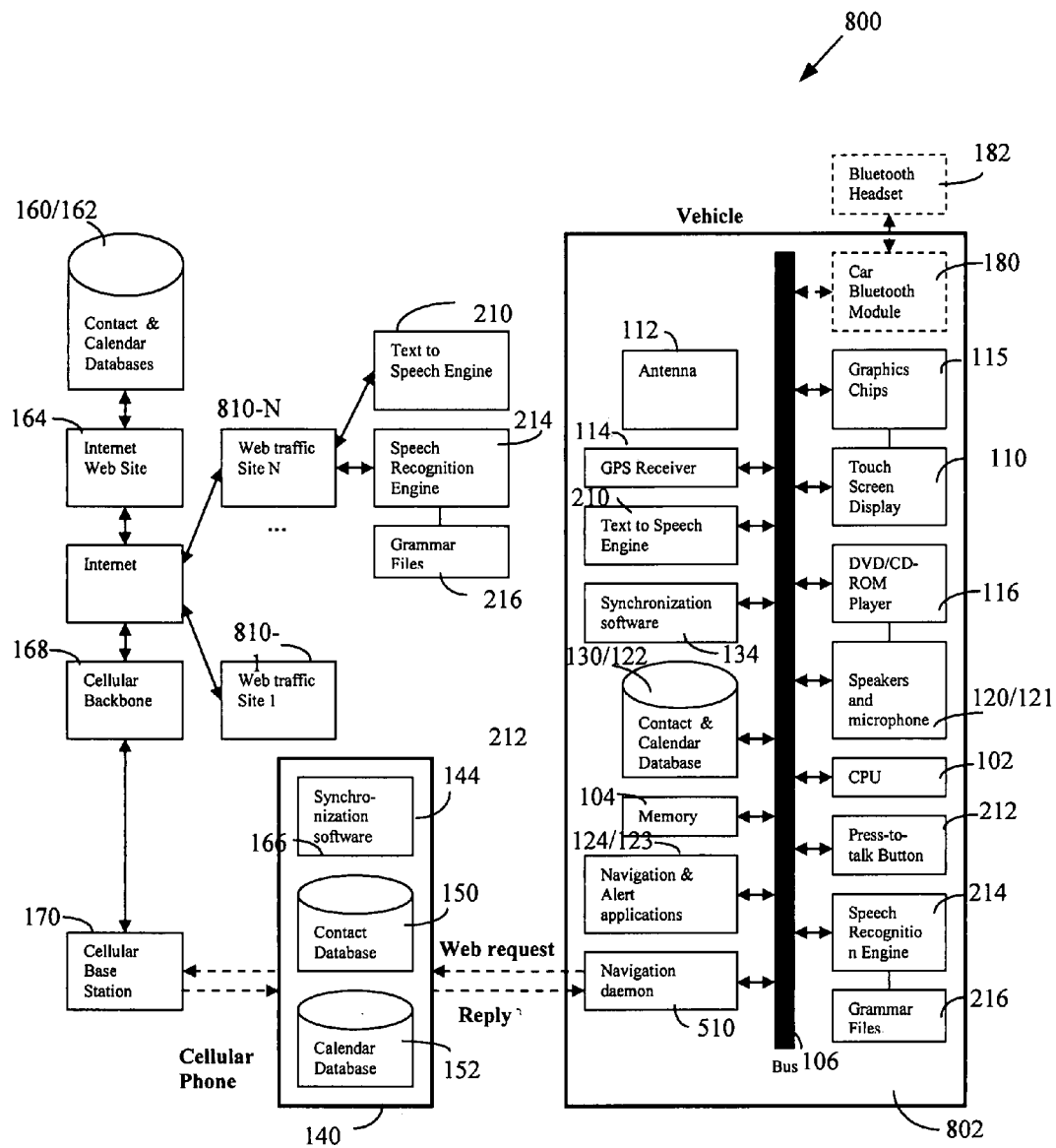
FIG. 8 is a schematic diagram illustrating a car navigation system that uses web traffic/weather information to improve its route planning.

FIG. 8 illustrates a navigation system 800 with improved path planning according to one embodiment of the present invention. System 800 may use information from traffic and weather web sites 810-1 through 810-N to improve path planning by avoiding congested areas in its car navigation program. Vehicle 802 may launch navigation software daemon 510 for communication with weather and sig-alert traffic web sites 810-1 through 810-N. In one embodiment, cell phone 140 may act as a network router for communication between web traffic sites 810 and navigation daemon 510. In one example, the cell phone 140 communicates through Bluetooth. In another example, the cell phone communication is through WiMax. In another embodiment, GPS receiver 114 of vehicle 802 may have wireless connectivity with integrated WLAN, Bluetooth, WiMax, and 3G/4G cellular radios, thereby allowing it to connect directly to cellular base station 170 (or other types of base stations like WLAN, WiMax) and web traffic sites 810-1 through 810-N without having to use cellular phone 140 as a network router. In one example, navigation software daemon 510 may send a request to traffic web site 810-1. The daemon 510 may include the GPS coordinate of the vehicle 802 taken from the GPS receiver 114 and/or its destination address in the request to the traffic web site 810. The traffic web site 810 may respond by sending a list of coordinates of traffic jam roads and intersections within the area of interest, a given radius, or the path between the GPS coordinate and the destination. After the navigation daemon 510 receives the list of traffic jam roads and intersections, it may forward them to navigation application 124. The navigation application's path planning algorithm may alter the path based on the information received. In one example, the traffic jam areas are marked on the navigation map so the driver knows why he is being diverted onto a different route. In one example, the navigation software daemon 510 continues to send updated requests to the traffic web site 810 at regular time intervals and the web site 810 may respond with updated traffic and weather information. Thus, the path planning and the displayed locations of traffic jams on the map can continue to be updated. Similar to web traffic sites, web weather alert sites can provide information about bad road conditions due to weather, and hence can be used to find alternative routes where weather is not an issue. This may be useful in longer distance journeys.

The elements of FIG. 8 not otherwise discussed are similar to the same-numbered elements described with reference to FIG. 1 and other figures.

In one embodiment, the request and the responses may use XML for message passing. For example XML may be used to specify the location of traffic jam areas in a standardized manner. The web servers 810 can also use XML formats such as Web Services Description Language (WSDL) to describe their web services so that the navigation software daemon 510 can read the WSDL and find what functions the server 810 supports. In one embodiment, web traffic sites 810-1 through 810-N may contain text to speech engine 210, speech recognition engine 214, and grammar files 216. Thus, the vehicle user could interact with the navigation sites using voice (i.e., "Show me all traffic jam in Los Angeles), and the traffic site can respond with voice which is fed to the car's speech recognition engine and the locations are marked on the map.

Figure 9:
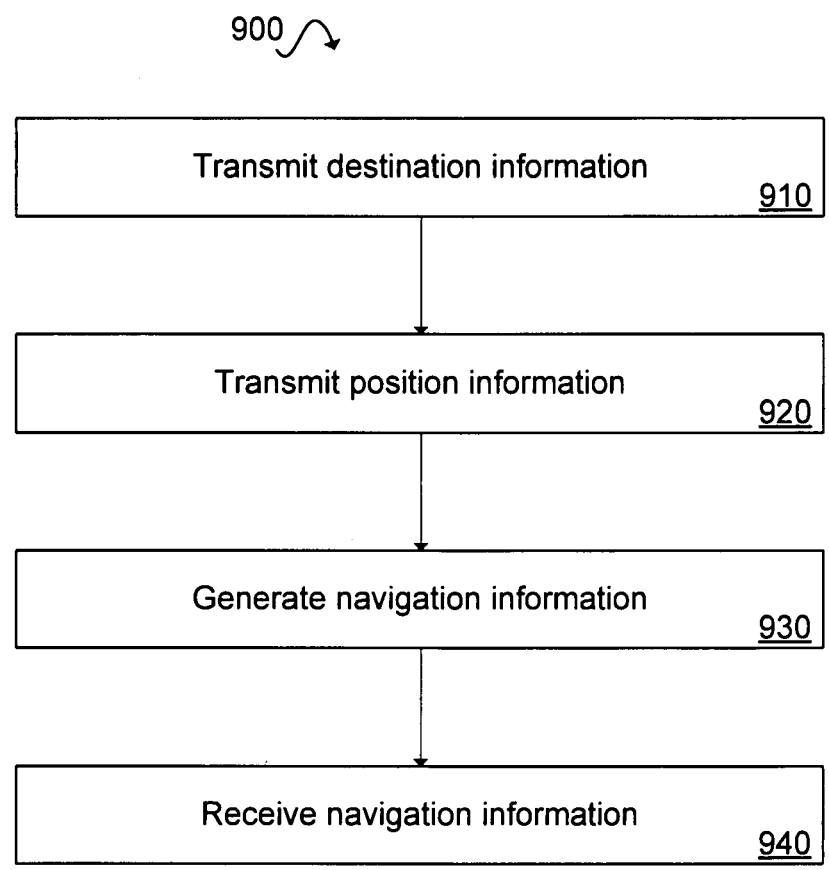
FIG. 9 is a flowchart of a method of displaying navigation information according to an embodiment of the present invention.

FIG. 9 is a flowchart of a method of displaying navigation information 900 according to an embodiment of the present invention. The method 900 may be performed by the systems detailed with reference to the previous figures, or by components thereof. The method 900 may be at least partly performed by a computer program.

In step 910, a destination is transmitted to a navigation server through a wireless communication channel. For example, the cellular phone 304 transmits a destination to the web navigation site 310-1 (see FIG. 3).

In step 920, position information is transmitted from a GPS-enabled device to the navigation server. This information is transmitted through the wireless communication channel automatically at a time interval. For example, the cellular phone 304 transmits position information to the web navigation site 310-1 (see FIG. 3).

In step 930, navigation information is generated by the navigation server. The navigation information is based on the position information and the destination. For example, the web navigation site 310-1 generates navigation information based on the position information and the destination. (see FIG. 3).

In step 940, the navigation information is received by the GPS-enabled device from the navigation server through the wireless communication channel. The navigation information may also be output to show the position on the map. For example, the cellular phone 304 displays the navigation information on its display 326 (see FIG. 3).

More details of these method steps may be obtained with reference to the various embodiments shown in the previous figures and accompanying description.

The navigation information may correspond to route information from the current position to the destination. The route information may then be used to give a different type of information than information based on just the current position.

For example, with reference to the navigation system 300 (see FIG. 3), the advertising may be targeted according to the route, not just the current position. If the user requests the nearest gas station, the navigation system 300 may provide information corresponding to the nearest gas station on the projected route. This may be useful when the user has just passed a gas station and is deciding whether to go to the next gas station or to perform a U-turn and go back to the previous gas station.

As another example, with reference to the navigation system 700 (see FIG. 7), the advertising may be targeted according to the route, not just the current position. Advertising based just on the current position may result in ads for locations that may be nearest, but have been passed. Advertising based on the route allows for the ads to be targeted according to future progress, which may be more useful to the user.

Certain embodiments of the present invention may have a number of advantages as compared to many existing navigation systems. The integration of a contacts and calendaring system with a navigation system, and synchronization thereof, increases efficiency as compared to having separate systems. The use of Bluetooth technology in various embodiments increases safety and convenience. The combination of cellular systems and navigation systems allows for the most recent information to be available. Automatically transmitting the position information saves the user from having to manually enter the position information into a map server.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of providing improved navigation using a contact list stored on a mobile device, the method comprising:
    at a GPS-enabled car navigation system communicatively coupled to the mobile device via a communication link, receiving the contact list comprising a set of contacts from the mobile device via the communication link, each particular contact comprising an identity and a physical address of the particular contact;
    at the car navigation system, receiving an identity of a contact from the received set of contacts;
    at the car navigation system, mapping the identity of the contact to a physical address of the contact, wherein the physical address is received from the mobile device; and
    at the car navigation system, determining navigation information based on a current location as a starting point and the physical address of the contact as a destination without communicating with the mobile device.

2. The method of claim 1 further comprising storing the contact list in a data storage of the car navigation system.

3. The method of claim 1, wherein the identity of the contact is received through a voice command.

4. The method of claim 1, wherein the contact list is received from the Internet through the mobile device.

5. The method of claim 1, wherein the contact is a person and the identity is a name of the person.

6. The method of claim 1, wherein the contact is a location and the identity is a name of the location.

7. The method of claim 1, wherein the contact is a business and the identity is a name of the business.

8. The method of claim 1, wherein the identity of a contact is a phone number of the contact.

9. The method of claim 1, wherein the communication link is a short range communication link.

10. A method of providing improved navigation, the method comprising:
    at a GPS-enabled car navigation system, receiving information of a set of entities from a mobile device connected to the car navigation system via a short range communication link, the information of each particular entity comprising an identity and a physical address of the particular entity;
    storing the information of the set of entities in a data storage of the GPS-enabled car navigation system;
    at the car navigation system while cellular service is not available for the mobile device:
        receiving an identity of a particular entity from the set of entities; and
        generating navigation information from a current location to a physical address of the particular entity.

11. The method of claim 10 further comprising mapping, at the car navigation system, the identity of the particular entity to a physical address of the particular entity without using the communication link.

12. The method of claim 10, wherein the identity of the particular entity is received through a voice command.

13. The method of claim 10, wherein the information of the set of entities is received from the Internet through the mobile device.

14. The method of claim 10, wherein the information of the set of entities is stored on the mobile device.

15. The method of claim 10, wherein the particular entity is a person and the identity is a name of the person.

16. The method of claim 10, wherein the particular entity is a location and the identity is a name of the location.

17. The method of claim 10, wherein the particular entity is a business and the identity is a name of the business.

18. The method of claim 10, wherein the identity of an entity is a phone number of the entity.

19. The method of claim 10, wherein the short range communication link uses one of Bluetooth, Wireless LAN, Ultra-WideBand, WiMax, and Zigbee technologies.

20. A method of providing improved navigation, the method comprising:
- at a GPS-enabled car navigation system communicatively coupled to a mobile device via a communication link, receiving information of a plurality of appointments from the mobile device via the communication link, the information of each particular appointment comprising a time and a location;
- storing the information of the plurality of appointments in a data storage of the car navigation system;
- for each particular appointment in the plurality of appointments:
  - at a predetermined time before the time of the particular appointment, triggering an alert through the car navigation system without communicating with the mobile device, the alert indicating the particular appointment is approaching; and
  - at the car navigation system, determining navigation information based on a current location and the location of the particular appointment without communicating with the mobile device.

21. The method of claim 20, wherein the alert comprises providing a reminder of the particular appointment through a speech interface of the car navigation system.

22. The method of claim 20 further comprising displaying the determined navigation information on a display screen of the car navigation system.

23. The method of 22 further comprising receiving a command at the car navigation system before displaying the determined navigation information on the display screen.

24. The method of claim 20, wherein the alert comprises presenting the information of the particular appointment on a display screen of the car navigation system.

25. The method of claim 20, wherein said information of the plurality of appointments is received from the Internet through the mobile device.

26. A non-transitory computer readable medium storing a computer program for execution by a GPS-enabled car navigation system, the computer program comprising sets of instructions for:
- receiving information of a plurality of appointments from a mobile device connected to the car navigation system via a communication link, the information of each particular appointment comprising a time and a location;
- storing the information of the plurality of appointments in a data storage of the car navigation system;
- triggering an alert to indicate an upcoming appointment at a predetermined time before the time of the upcoming appointment; and
- determining navigation information based on a current location and the location of the upcoming appointment, said triggering and determining not requiring availability of cellular service.

27. The non-transitory computer readable medium of claim 26, wherein the set of instructions for triggering the alert comprises a set of instructions for providing a reminder of the upcoming appointment through a speech interface of the car navigation system.

28. The non-transitory computer readable medium of claim 26, wherein the computer program further comprises a set of instructions for displaying the determined navigation information on a display screen of the car navigation system.

29. The non-transitory computer readable medium of 28, wherein the computer program further comprises a set of instructions for receiving a command before displaying the determined navigation information on the display screen.

30. The non-transitory computer readable medium of claim 26, wherein the set of instructions for triggering the alert further comprises a set of instructions for presenting the information of the appointment through a display screen of the car navigation system.

31. The non-transitory computer readable medium of claim 26, wherein said information of the plurality of appointments is received from the Internet through the mobile device.

* * * * *